US008861442B2

(12) United States Patent
Zhu et al.

(10) Patent No.: US 8,861,442 B2
(45) Date of Patent: Oct. 14, 2014

(54) POWER CONTROL METHOD AND RADIO NETWORK CONTROLLER

(75) Inventors: Ling Zhu, Su Zhou (CN); Sheng Qiu, Jiangsu (CN)

(73) Assignee: Sernet (Suzhou) Technologies Corporation, Jiangsu (CN)

( * ) Notice: Subject to any disclaimer, the term of this patent is extended or adjusted under 35 U.S.C. 154(b) by 79 days.

(21) Appl. No.: 13/614,034

(22) Filed: Sep. 13, 2012

(65) Prior Publication Data

US 2013/0064183 A1  Mar. 14, 2013

(30) Foreign Application Priority Data

Sep. 13, 2011  (CN) .......................... 2011 1 0269143

(51) Int. Cl.
*H04W 4/00* (2009.01)
*H04W 52/38* (2009.01)
*H04W 52/20* (2009.01)
*H04W 52/12* (2009.01)

(52) U.S. Cl.
CPC ............ *H04W 52/20* (2013.01); *H04W 52/386* (2013.01); *H04W 52/12* (2013.01)
USPC ........................................................ 370/328

(58) Field of Classification Search
None
See application file for complete search history.

(56) References Cited

U.S. PATENT DOCUMENTS

| | | | | |
|---|---|---|---|---|
| 2004/0106425 A1* | 6/2004 | Koo et al. | ...................... | 455/522 |
| 2004/0116142 A1* | 6/2004 | Wang et al. | ..................... | 455/522 |
| 2005/0215276 A1* | 9/2005 | Koo et al. | ...................... | 455/522 |
| 2006/0026490 A1* | 2/2006 | Rinne et al. | .................... | 714/774 |
| 2006/0067276 A1* | 3/2006 | Bi et al. | ........................ | 370/333 |
| 2007/0042718 A1* | 2/2007 | Camacho et al. | ............... | 455/69 |
| 2007/0173281 A1* | 7/2007 | Koo et al. | ...................... | 455/522 |
| 2010/0144381 A1* | 6/2010 | Park et al. | ...................... | 455/501 |
| 2010/0222094 A1* | 9/2010 | Usuda et al. | .................. | 455/522 |
| 2010/0246520 A1* | 9/2010 | Andersson | ..................... | 370/329 |
| 2010/0296422 A1* | 11/2010 | Ericson et al. | ................ | 370/310 |
| 2011/0159899 A1* | 6/2011 | Koo et al. | ...................... | 455/501 |
| 2011/0190023 A1* | 8/2011 | Hannu et al. | .................. | 455/522 |
| 2011/0299447 A1* | 12/2011 | Rudolf et al. | ................. | 370/311 |
| 2012/0033578 A1* | 2/2012 | Anderson | ..................... | 370/252 |
| 2012/0093108 A1* | 4/2012 | Wengerter et al. | ............ | 370/329 |
| 2012/0250525 A1* | 10/2012 | Rudolf et al. | ................. | 370/242 |
| 2012/0281642 A1* | 11/2012 | Sambhwani et al. | ......... | 370/329 |
| 2012/0287798 A1* | 11/2012 | Sambhwani et al. | ......... | 370/252 |
| 2012/0287867 A1* | 11/2012 | Sambhwani et al. | ......... | 370/329 |
| 2012/0287868 A1* | 11/2012 | Sambhwani et al. | ......... | 370/329 |
| 2012/0287965 A1* | 11/2012 | Sambhwani et al. | ......... | 375/141 |
| 2013/0072250 A1* | 3/2013 | Zhang et al. | .................. | 455/522 |
| 2014/0128121 A1* | 5/2014 | Koo et al. | ...................... | 455/522 |

* cited by examiner

*Primary Examiner* — Suk Jin Kang
(74) *Attorney, Agent, or Firm* — McClure, Qualey & Rodack, LLP

(57) ABSTRACT

A power control method performing a power control operation between a radio network controller and a node B is provided. The method includes steps of: calculating a packet error rate threshold and a base received packet count according to a target block error rate (BLER) and a precision of the target BLER; obtaining an accumulated received packet count and an accumulated packet error count; increasing a target signal-to-interference ratio (SIR) of the node B when the accumulated packet error count is greater than a product of the accumulated received packet count and the packet error rate threshold; decreasing the target SIR when the accumulated received packet count is greater than or equal to a product of the base received packet count and a threshold parameter; and resetting the accumulated received packet count and the accumulated packet error count after the target SIR is adjusted.

14 Claims, 4 Drawing Sheets

POWER CONTROL METHOD AND RADIO NETWORK CONTROLLER

This application claims the benefit of People's Republic of China application Serial No. 201110269143.9, filed Sep. 13, 2011, the disclosure of which is incorporated by reference herein in its entirety.

BACKGROUND OF THE INVENTION

1. Field of the Invention

The invention relates in general to a power control method and a radio network controller (RNC), and more particularly to a power control method and an RNC for performing an outer loop power control operation.

2. Description of the Related Art

With advancements in technologies, the $3^{rd}$ Generation Partnership Project (3GPP) protocol is prevalent in applications of macrocells and femtocells to bring convenience to the daily life. In current techniques, power control mechanisms in 3GPP compliant communication systems can be categorized into open loop power control and closed loop power control. The closed loop power control is further divided into inner loop power control and outer loop power control.

In general, the inner loop power control compensates fast fading of a signal by adjusting transmission power of a user equipment (UE) or a base station, whereas the outer loop ensures that a communication system is offered with adequate quality having an acceptable transmission error rate by controlling a target value of a signal-to-interference ratio (SIR). As the 3GPP continues to prevail, it is a common goal of manufacturers to provide an even more efficient power control method.

SUMMARY OF THE INVENTION

The invention is directed to a power control method and a radio network controller (RNC) for performing a power control operation between the RNC and a node B. In the control method and the RNC of the present invention, a packet error rate threshold is calculated with reference to a target block error rate (BLER) and a precision of the target BLER, and an accumulated received packet count and an accumulated packet error count are also correspondingly calculated. Further, in the control method and the RNC of the present invention, it is determined whether to increase a target signal-to-interference ratio (SIR) of the node B through determining whether the accumulated packet error count is greater than a product of the accumulated received packet count and the packet error rate threshold. Therefore, compared to a conventional power control method, the power control method and the RNC of the present invention determine whether to increase the target SIR of the node B with reference to the accumulated packet error count and the product of the accumulated received packet count and the error packet error threshold.

According to an aspect of the present invention, a power control method for is provided. The method is applied to an RNC to perform a power control operation between the RNC and a node B. The method includes steps of: calculating a packet error rate threshold and a base received packet count according to a target BLER and a precision of the target BLER; obtaining a received packet count and a packet error count in an operation period of the RNC, and adding received packet count and the packet error count to an accumulated received packet count and an accumulated packet error count, respectively; determining whether the accumulated packet error count is greater than a product of the accumulated received packet count and the packet error rate threshold; increasing a target SIR of the node B when the accumulated packet error count is greater than the product of the previous step; determining whether the accumulated received packet count is greater than or equal to a product of the base received packet count and a threshold parameter; decreasing the target SIR of the node B when the accumulated received packet count is greater than or equal to the product of the previous step; determining whether the target SIR is adjusted in one of the foregoing steps of increasing or decreasing the target SIR; and if so, resetting the accumulated received packet count and the accumulated packet error count.

According to another aspect of the present invention, an RNC is provided. The RNC includes an initial configuration unit, a data preparing unit, a first increase determination unit, a decrease determination unit and a reset unit. The initial configuration unit calculates a packet error rate threshold and a base received packet count according to a target BLER and a precision of the target BLER. The data preparing unit obtains a received packet count and a packet error count in an operation period of the RNC, and respectively adds the received packet count and the packet error count to an accumulated received packet count and an accumulated packet error count. The first increase determination unit determines whether the accumulated packet error count is greater than a product of the accumulated received packet count and the packet error rate threshold, and increases a target SIR of the node B when the accumulated packet error count is greater than the product. The decrease determination unit determines whether the accumulated received packet count is greater than or equal to a product of the base received packet count and a threshold parameter, and decreases the target SIR of the node B when the accumulated received packet count is greater than the product. The reset unit determines whether the first increase determination unit or the decrease determination unit adjusts the target SIR, and resets the accumulated received packet count and the accumulated packet error count when the first increase determination unit or the decrease determination unit adjusts the target SIR.

Therefore, in the power control method and the RNC of the present invention, the RNC calculates the packet error rate threshold with reference to the target BLER and the precision of the target BLER, and correspondingly calculates the accumulated received packet count and the accumulated packet error count. In addition, in the power control method and the RNC of the present invention, the RNC further determines whether to increase the target SIR of the node B by determining whether the accumulated packet error count is greater than the product of the accumulated received packet and the packet error rate threshold. Compared to a conventional power control method, the power control method and the RNC of some embodiments determine whether to increase the target SIR of the node B with reference to the accumulated packet error count and the product of the accumulated received packet count and the error packet error threshold.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
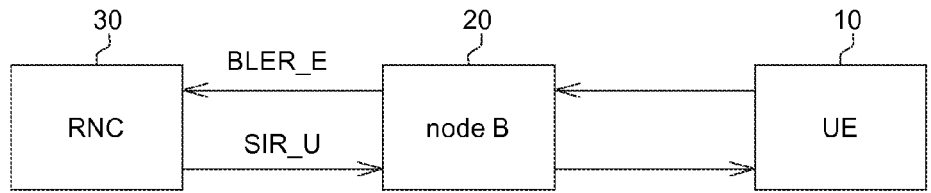
FIG. 1 is a block diagram of a radio communication system according to one embodiment of the present invention.

FIG. 1 shows a block diagram of a radio communication system according to one embodiment of the present invention. A radio communication system 1 according to this embodiment includes a user equipment (UE) 10, a node B 20 and a radio network controller (RNC) 30. For example, the radio communication system 1 is compliant to the $3^{rd}$ Generation Partnership Project (3GPP) protocol, and the UE 10 is a handheld device such as a mobile phone capable of 3GPP communication operations.

In one embodiment, the node B 20 and the RNC 30 may be implemented by way of a femtocell to provide services to a UE located in a smaller area. The node B 20 may be low-level protocols of the femtocell and the RNC 30 may be a main control mechanism of the femtocell. For example, the femtocell may operate in a hybrid mode to provide services to UEs with very-important-person (VIP) and non-very-important-person (NVIP) identities.

Figure 2:
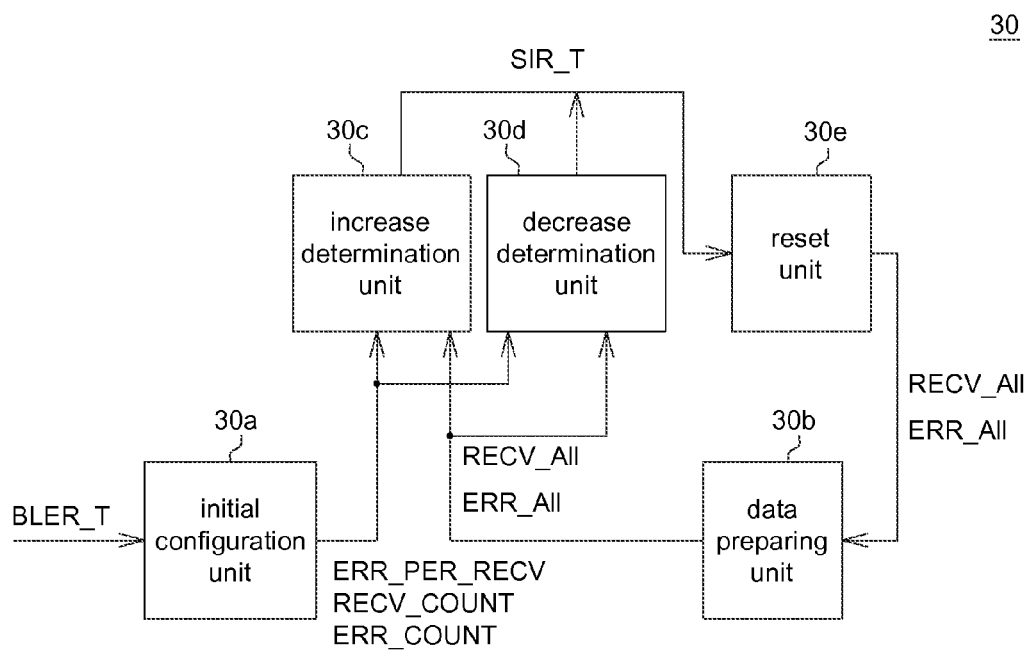
FIG. 2 is a detailed block diagram of an RNC 30 in FIG. 1.

The RNC 30 performs a power control operation between the RNC 30 and the node B, e.g., outer loop power control. FIG. 2 shows a detailed block diagram of the RNC 30 in FIG. 1. The RNC 30 includes an initial configuration unit 30a, a data preparing unit 30b, an increase determination unit 30c, a decrease determination unit 30d and a reset unit 30e.

The initial configuration unit 30a calculates multiple initial parameters according to a target block error rate (BLER) (denoted by BLER_T) and a precision of the target BLER (BLER_T). For example, the target BLER (BLER_T) is determined by a user through an operation, administration and maintenance (OAM) unit. For example, the target BLER (BLER_T) is 0.1%; i.e., a corresponding precision of the target BLER (BLER_T) is 1/1000.

For example, the initial parameters determined by the initial configuration unit 30a include a packet error rate threshold (ERR_PER_RECV), a base received packet count (RECV_COUNT) and a tolerable packet error count (ERR_COUNT). For example, the base received packet count (RECV_COUNT) is an inverse value of the target BLER (BLER_T). Taking the example of the target BLER (BLER_T) being 0.1% for instance, the precision of the target BLER (BLER_T) is 1/1000, and the corresponding base received packet count (RECV_COUNT) is 1000.

For example, a VIP UE and an NVIP UE respectively correspond to the different tolerable packet error counts ERR_COUNT VIP and ERR_COUNT NVIP, and different packet error rate thresholds ERR_PER_RECV_VIP and ERR_PER_RECV_NVIP. In the following description, details of how the initial configuration unit 30a calculates the tolerable error rate counts ERR_COUNT_VIP and ERR_COUNT_NVIP as well as the packet error rate thresholds ERR_PER_RECV_VIP and ERR_PER_RECV_NVIP shall be exemplified.

For example, the initial configuration unit 30a calculates the packet error rate threshold (ERR_PER_RECV_VIP) and the tolerable error rate count (ERR_COUNT_VIP) according to equations (1) to (4):

$$\text{ERR\_COUNT\_BASE} = \text{RECV\_COUNT} \times \text{BLER\_T} \quad (1)$$

$$\text{ERR\_FLOAT\_VIP} = \text{ERR\_COUNT\_BASE} \times \text{VIP\_RATE} \quad (2)$$

$$\text{ERR\_COUNT\_VIP} = \text{ERR\_COUNT\_BASE} + \text{ERR\_FLOAT\_VIP} \quad (3)$$

$$\text{ERR\_PER\_RECV\_VIP} = \text{ERR\_COUNT\_VIP}/\text{RECV\_COUNT} \quad (4)$$

For example, under a condition that the packet error rate corresponds to the target BLER (BLER_T), ERR_COUNT_BASE indicates a packet error count in packets which may occur each time one base received packet count RECV_COUNT (e.g., 1000) of packets are received. VIP_RATE and ERR_FLOAT_VIP respectively indicate a floating rate of packet error rate and a packet error count range for the VIP UE. The tolerable packet error count ERR_COUNT_VIP indicates a total count of error packets which may occur every time one base received packet count RECV_COUNT (e.g., 1000) of packets are received, with respect to the VIP UE.

The initial configuration unit 30a calculates the tolerable error rate count (ERR_COUNT_NVIP) and the packet error rate threshold (ERR_PER_RECV_NVIP) according to equations (5) to (7):

$$\text{ERR\_FLOAT\_NVIP} = \text{ERR\_COUNT\_BASE} \times \text{NVIP\_RATE} \quad (5)$$

$$\text{ERR\_COUNT\_VNIP} = \text{ERR\_COUNT\_BASE} + \text{ERR\_FLOAT\_NVIP} \quad (6)$$

$$\text{ERR\_PER\_RECV\_NVIP} = \text{ERR\_COUNT\_NVIP}/\text{RECV\_COUNT} \quad (7)$$

Similarly, NVIP_RATE and ERR_FLOAT_NVIP respectively indicate a floating rate of packet error rate and a packet error count range for the NVIP UE, and the tolerable packet error count (ERR_COUNT_NVIP) indicates a total count of error packets which may occur every time one base received packet count RECV_COUNT (e.g. 1000) of packets are received, with respect to the NVIP UE.

The data preparing unit 30b obtains the received packet count (RECV_T) and the packet error count (ERR_T) in an operation period (OLPC_T) of the RNC 30, and adds the received packet count (RECV_T) and the packet error count (ERR_T) to an accumulated received packet count (RECV_ALL) and an accumulated packet error count (ERR_ALL), respectively.

The increase determination unit 30c determines whether the accumulated packet error count (ERR_ALL) is greater than a product of the accumulated received packet count (RECV_ALL) and the packet error rate threshold. For example, when a UE has the identity of VIP, a determination condition of the increase determination unit 30c may be represented by equation (8):

$$\text{ERR\_ALL} > \text{RECV\_ALL} \times \text{ERR\_PER\_RECV\_VIP} \quad (8)$$

Similarly, if a UE has the identity of NVIPUE, the determination condition of the increase determination unit 30c may be represented by equation (9):

$$\text{ERR\_ALL} > \text{RECV\_ALL} \times \text{ERR\_PER\_RECV\_NVIP} \quad (9)$$

When the accumulated packet error count (ERR_ALL) is greater than the product, the increase determination unit 30c increases a target signal-to-interference ratio (SIR) of the node B.

Figure 3:
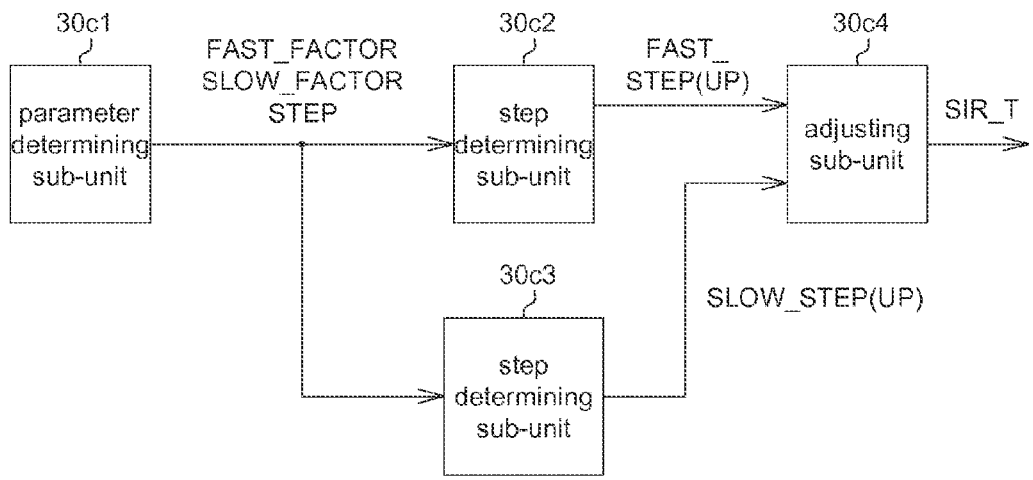
FIG. 3 is a detailed block diagram of an increase determination unit 30c in FIG. 2.

FIG. 3 shows a detailed block diagram of the increase determination unit 30c in FIG. 2. For example, the increase determination unit 30c includes a parameter determining sub-unit 30c1, step determining sub-units 30c2 and 30c3, and an adjusting sub-unit 30c4. The parameter determining sub-unit 30c1 determines a fast factor parameter (FAST_FACTOR), a slow factor parameter (SLOW_FACTOR), and a step size (STEP). For example, the fast and slow factor parameters (FAST_FACTOR) and (SLOW_FACTOR) are natural numbers greater than 0 and smaller than or equal to 20, and the fast factor parameter (FAST_FACTOR) is greater than the slow factor parameter (SLOW_FACTOR). In one embodiment, the fast and slow factor parameters (FAST_FACTOR) and (SLOW_FACTOR) respectively equal 6 and 2.

The step determining sub-unit 30c2 generates a fast increase step (FAST_STEP(UP)) according to the fast factor parameter (FAST_FACTOR) and the step size (STEP). Similarly, the step adjusting sub-unit 30c3 generates a slow increase step (SLOW_STEP(UP)) according to the slow factor parameter (SLOW_FACTOR) and the step size (STEP).

The adjusting sub-unit 30c4 increases the target SIR corresponding to the VIP UE according to the fast increase step (FAST_STEP(UP)), and increases the target SIR corresponding to the NVIP UE according to the slow increase step (SLOW_STEP(UP)).

The decrease determination unit 30d determines whether the accumulated received packet count (RECV_ALL) is greater than a product of the base received packet count (RECV_COUNT) and a threshold parameter (OLPC_OK_RATE). For example, a determination condition of the decrease determination unit 30d is represented as equation (10):

$$\text{RECV\_ALL} \geq \text{RECV\_COUNT} \times \text{OLPC\_OK\_RATE} \tag{10}$$

When the accumulated packet error count (RECV_ALL) is greater than the product, the decreasing determination unit 30d decreases the target SIR (SIR_T) of the node B. The threshold parameter OLPC_OK_RATE may be any natural number, and is utilized for determining a possibility that the decrease determination unit 30d decreases the target SIR (SIR_T). For example, when the threshold parameter OLPC_OK_RATE is low, the product of the base received packet count RECV_COUNT and the threshold parameter OLPC_OK_RATE is smaller, so that the decrease determination unit 30d is allowed to more sensitively decrease the target SIR (SIR_T).

In contrast, when the threshold parameter OLPC_OK_RATE is high, the product of the base received packet count RECV_COUNT and the threshold parameter OLPC_OK_RATE gets larger. The larger product correspondingly lowers the possibility that the decrease determination unit 30d decreases the target SIR (SIR_T), so that the target SIR (SIR_T) is likely maintained at a higher value.

Figure 4:
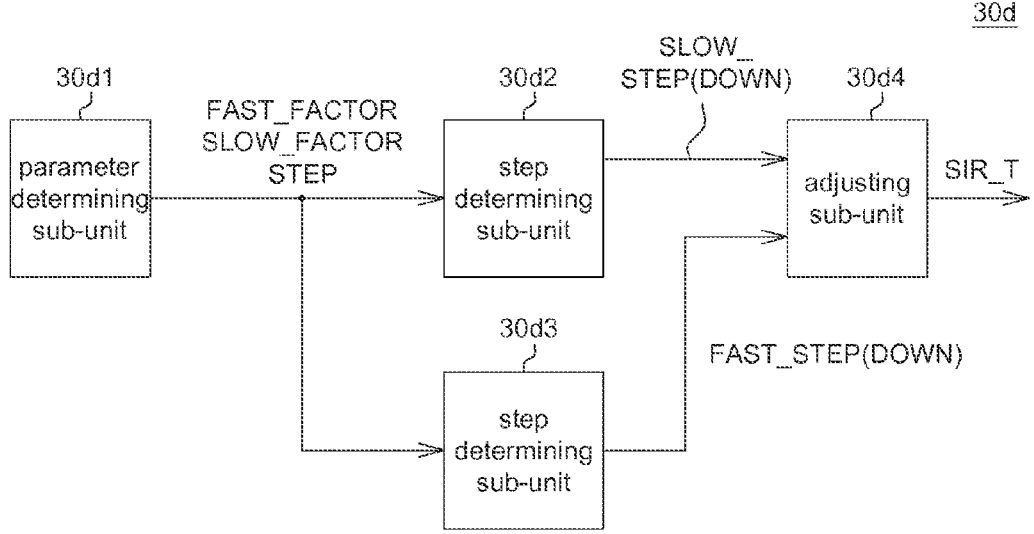
FIG. 4 is a detailed block diagram of a decrease determination unit 30d in FIG. 2.

FIG. 4 shows a detailed block diagram of the decrease determination unit 30d in FIG. 2. For example, the decrease determination unit 30d includes a parameter determining sub-unit 30d1, step determining sub-units 30d2 and 30d3, and an adjusting sub-unit 30d4. Similar to the parameter determining sub-unit 30c1, the parameter determining sub-unit 30d1 determines the fast factor parameter (FAST_FACTOR), the slow factor parameter (SLOW_FACTOR) and the step size (STEP).

The step determining sub-unit 30d2 generates a slow decrease step (SLOW_STEP(DOWN)) according to the slow factor parameter (SLOW_FACTOR) and the step size (STEP). Similarly, the step adjusting sub-unit 30d3 generates a fast decrease step (FAST_STEP(DOWN)) according to the fast factor parameter (FAST_FACTOR) and the step size (STEP).

The adjusting sub-unit 30d4 decreases the target SIR corresponding to the VIP UE according to the slow decrease step (SLOW_STEP(DOWN)), and decreases the target SIR corresponding to the NVIP UE according to the fast decrease step (FAST_STEP(DOWN)).

In other words, similar to the increase determination unit 30c, the decrease determination unit 30d may also adjust a corresponding target SIR, with respect to any UE with different identity, according to different step sizes. More specifically, the decrease determination unit 30d decreases the target SIR of a VIP UE according to the slow decrease step (SLOW_STEP(DOWN)) (corresponding to a smaller value), and decreases the target SIR of an NVIP UE according to the fast decrease step (FAST_STEP(DOWN)) (corresponding to a larger value).

The reset unit 30e determines whether the increase and decrease determination units 30c and 30d adjust the target SIR (SIR_T). When the increase and decrease determination units 30c and 30d adjust the target SIR (SIR_T), the reset unit 30e correspondingly resets the accumulated received packet count (RECV_ALL) and the accumulated packet error count (ERR_ALL). When the increase and decrease determination units 30c and 30d do not adjust the target SIR (SIR_T), the reset unit 30e further determines whether the accumulated received packet count (RECV_ALL) is greater than or equal to the base received packet count (RECV_COUNT). When the accumulated received packet count (RECV_ALL) is greater than or equal to the base received packet count (RECV_COUNT), the reset unit 30e also resets the accumulated received packet count (RECV_ALL) and the accumulated packet error count (ERR_ALL).

After the reset operations of the reset unit 30e, the data preparing unit 30b, the increase determination unit 30c and the decrease determination unit 30d may further iterate the corresponding steps to perform loop control with respect to the target SIR (SIR_T).

Figure 5:
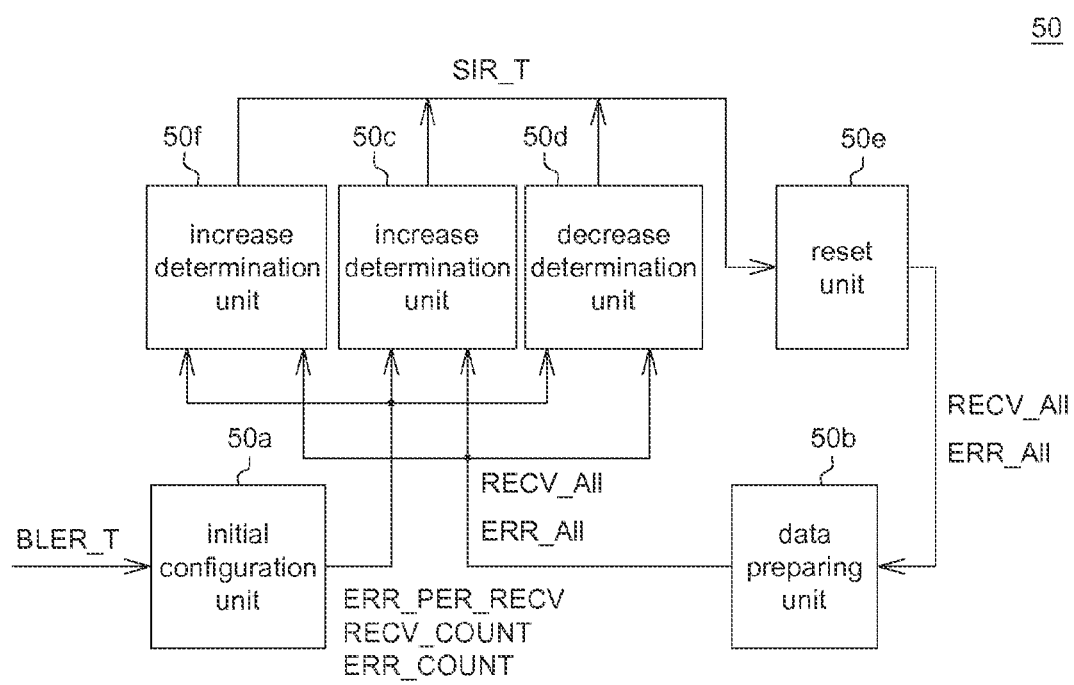
FIG. 5 is a detailed block diagram of an RNC 50 according to another embodiment of the present invention.

It should be noted that the example of the RNC 30 shown in FIG. 2 is used for illustrative purposes rather than limiting the present invention thereto. Referring to FIG. 5 showing another embodiment, an RNC 50 may include an increase determination unit 50f, which determines whether to increase the target SIR (SIR_T) of the node 20 with reference to the accumulated packet error count (ERR_ALL) and the tolerable packet error count (ERR_COUNT).

Further, determination operations of the increase determination unit 50f may be represented by equation (11) or (12):

$$\text{ERR\_ALL} \geq \text{ERR\_COUNT\_VIP} \tag{11}$$

$$\text{ERR\_ALL} \geq \text{ERR\_COUNT\_NVIP} \tag{12}$$

In other words, for the VIP UE, the increase determination unit 50f determines whether to increase the target SIR (SIR_T) according to a condition of whether the accumulated packet error count (ERR_ALL) is greater than or equal to the tolerable packet error count (ERR_COUNT_VIP); for the NVIP UE, the increase determination unit 50f determines whether to increase the target SIR (SIR_T) according to a condition of whether the accumulated packet error count (ERR_ALL) is greater than or equal to the tolerable packet error count (ERR_COUNT_NVIP).

Referring to FIG. 5, the RNC 50 includes two different increase determination units 50c and 50f. For example, a user may selectively enable one or both of the increase determination units 50c and 50f to correspondingly increase an associated target SIR (SIR_T).

For example, similar to the increase determination unit 30c, the increase determination unit 50f including sub-units shown in FIG. 3 may also determine a step size for increasing the target SIR (SIR_T).

Figure 6:
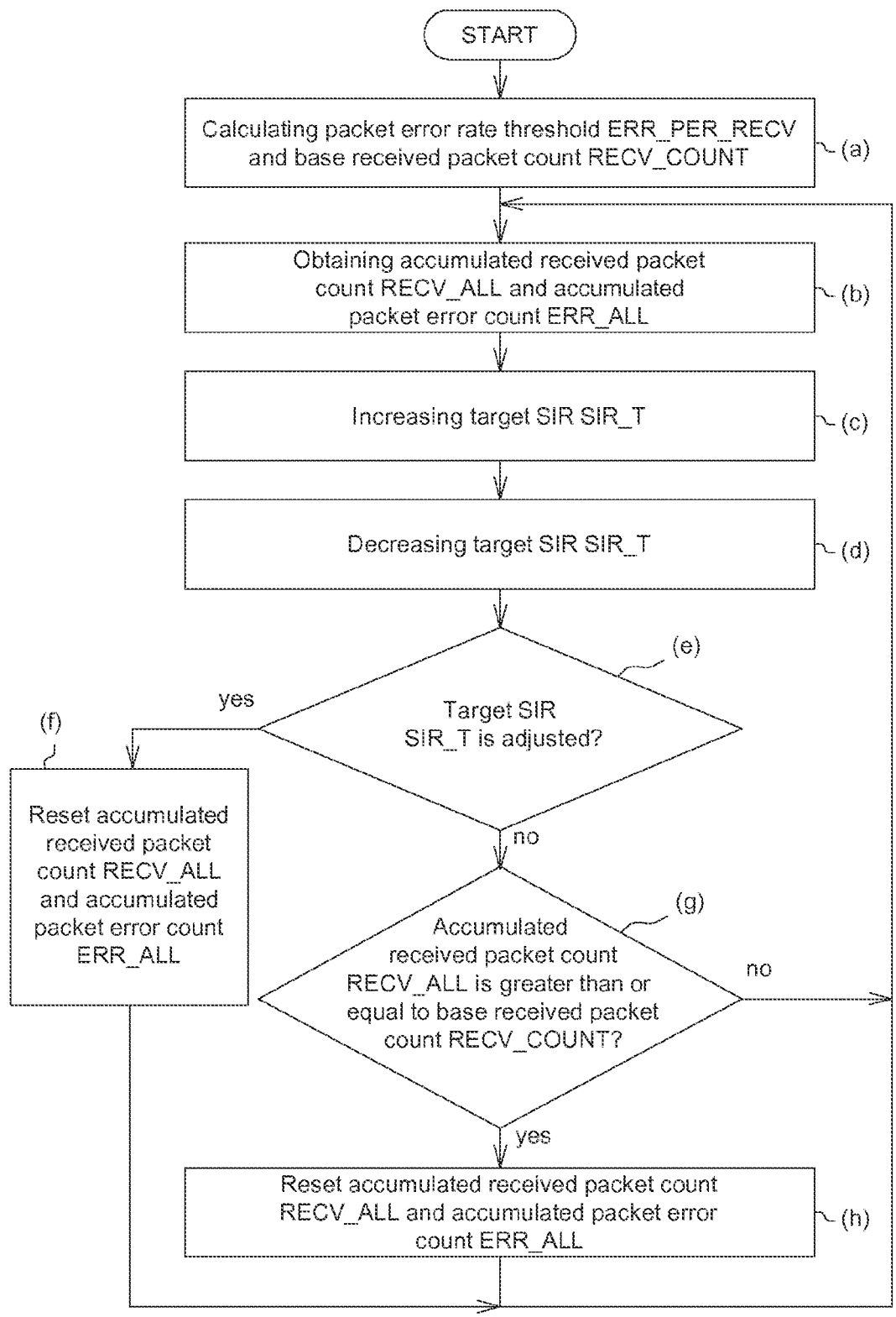
FIG. 6 is a flowchart of a power control method according to one embodiment of the present invention.

FIG. 6 shows a flowchart of a power control method according to one embodiment of the present invention. The method includes the following steps, e.g., for outer loop power control. In step (a), the initial configuration unit 30a calculates a corresponding packet error rate threshold (ERR_PER_RECV), a base received packet count (RECV_COUNT) and a tolerable packet error count (ERR_COUNT) according to a target BLER (BLER_T) and a precision of the target BLER (BLER_T).

In step (b), the data preparing unit 30b obtains a received packet count (RECV_T) and a packet error count (ERR_T) within an operation period of the RNC 30, and respectively adds the received packet count (RECV_T) and the packet error count (ERR_T) to an accumulated received packet count (RECV_ALL) and an accumulated packet error count (ERR_ALL).

In step (c), the increase determination unit 30c determines whether the accumulated packet error count (ERR_ALL) is greater than a product of the accumulated received packet count (RECV_ALL) and a packet error rate threshold (ERR_PER_RECV), and increase a target SIR (SIR_T) of the node B 20 when the accumulated packet error count (ERR_ALL) is greater than the product.

In step (d), the decrease determination unit 30d determines whether the accumulated received packet count (RECV_ALL) is greater than or equal to a product of the base received packet count (RECV_COUNT) and a threshold parameter (VIP_RATE) (or (NVIP_RATE)), and decreases the target SIR (SIR_T) of the node B when the accumulated received packet count (RECV_ALL) is greater than or equal to the product.

In step (e), the reset unit 30e determines whether the target SIR (SIR_T) is adjusted in step (c) or step (d). When the target SIR (SIR_T) is adjusted, step (f) is performed to reset the accumulated received packet count (RECV_ALL) and the accumulated packet error count (ERR_ALL).

When the target SIR (SIR_T) is not adjusted in step (c) or step (d), step (g) is performed. In step (g), the reset unit 30e further determines whether the accumulated received packet count (RECV_ALL) is greater than or equal to the base received packet count (RECV_COUNT). When the accumulated received packet count (RECV_ALL) is greater than or equal to the base received packet count (RECV_COUNT), step (h) is performed, in which the reset unit 30e resets the accumulated received packet count (RECV_ALL) and the accumulated packet error count (ERR_ALL). When the accumulated received packet count (RECV_ALL) is not greater than the base received packet count (RECV_COUNT) after steps (f) and (h), the power control method iterates steps (b) to (f) to perform loop control on the target SIR (SIR_T).

Therefore, in the power control method and the RNC disclosed by the embodiment of the present invention, the RNC calculates the packet error rate threshold with reference to the target BLER and the precision of the target BLER, and correspondingly calculates the accumulated received packet count and the accumulated packet error count. In addition, in the power control method and the RNC disclosed by the embodiment of the present invention, the RNC further determines whether to increase the target SIR of the node B by determining whether the accumulated packet error count is greater than the product of the accumulated received packet and the packet error rate threshold. Compared to a conventional power control method, the power control method and the RNC disclosed by the embodiment of the present invention determine whether to increase the target SIR of the node B with reference to the accumulated packet error count and the product of the accumulated received packet count and the error packet error threshold.

Further, in the power control method and the RNC disclosed by the embodiment of the present invention, the increase and decrease determination units determine different step sizes for UEs having different identities by using two different step determining sub-units, thereby adjusting the corresponding target SIR according to different step sizes. Therefore, compared to a conventional power control method, the power control method and the RNC disclosed by the embodiment of the present invention is further advantaged by offering diversified power adjustment solutions for adapting to UEs with different identities.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power control method, applied to a radio network controller (RNC), for performing an outer loop power control operation between the RNC and a node B, the method comprising:
    a) calculating a corresponding packet error rate threshold and a corresponding base received packet count according to a target block error rate (BLER) and a precision of the target BLER;
    b) obtaining a received packet count and a packet error count within an operation period of the RNC, and respectively adding the received packet count and the packet error count to an accumulated received packet count and an accumulated packet error count;
    c) determining whether the accumulated packet error count is greater than a product of the accumulated received packet count and the packet error rate threshold, and increasing a target signal-to-interference ratio (SIR) of the node B when the accumulated packet error count is greater than the product of the accumulated received packet count and the packet error rate threshold;
    d) determining whether the accumulated received packet count is greater than or equal to a product of the base received packet count and a threshold parameter, and decreasing the target SIR when the accumulated received packet count is greater than or equal to the product of the base received packet count and the threshold parameter;
    e) determining whether the target SIR is adjusted in step (c) or step (d), and performing step (f) when the target SIR is adjusted in step (c) or step (d); and
    f) resetting the accumulated received packet count and the accumulated packet error count if the target SIR is adjusted in step (c) or step (d).

2. The method according to claim 1, wherein step (a) comprises:
    calculating a tolerable packet error count according to a very-important-person (VIP) floating parameter or a non-VIP (NVIP) floating parameter, the target BLER and the base received packet count.

3. The method according to claim 2, further comprising:
c') determining whether the accumulated packet error count is greater than the tolerable packet error count to determine whether to increase the target SIR of the node B.

4. The method according to claim 1, after step (e), further comprising:
g) when the target SIR is not adjusted in step (c) or step (d), determining whether the accumulated received packet count is greater than or equal to the base received packet count, and performing step (h) when the accumulated received packet count is greater than or equal to the base received packet count; and
h) resetting the accumulated received packet count and the accumulated packet error count.

5. The method according to claim 4, after steps (f) and (h), further iterating steps (b) to (e) to perform loop control on the target SIR.

6. The method according to claim 1, wherein step (c) comprises:
c1) determining a fast factor parameter, a slow factor parameter and a step size;
c2) generating a fast increase step according to the fast factor parameter and the step size;
c3) increasing the target SIR corresponding to a very-important-person (VIP) user equipment (UE) according to the fast increase step;
c4) generating a slow increase step according to the slow factor parameter and the step size; and
c5) increasing the target SIR corresponding to a non-VIP (NVIP) UE according to the slow increase step.

7. The method according to claim 1, wherein step (d) comprises:
d1) determining a fast factor parameter, a slow factor parameter and a step size;
d2) generating a slow decrease step according to the slow factor parameter and the step size;
c3) decreasing the target SIR corresponding to a very-important-person (VIP) user equipment (UE) according to the slow decrease step;
c4) generating a fast decrease step according to the fast factor parameter and the step size; and
c5) decreasing the target SIR corresponding to a non-VIP (NVIP) UE according to the fast increase step.

8. A radio network controller, for performing an outer loop power control operation between the radio network controller and a node B, the radio network controller comprising:
an initial configuration unit, for calculating a corresponding packet error rate threshold and a corresponding base received packet count according to a target block error rate (BLER) and a precision of the target BLER;
a data preparing unit, for obtaining a received packet count and a packet error count within an operation period of the radio network controller, and respectively adding the received packet count and the packet error count to an accumulated received packet count and an accumulated packet error count;
a first increase determination unit, for determining whether the accumulated packet error count is greater than a product of the accumulated received packet count and the packet error rate threshold, and increasing a target signal-to-interference ratio (SIR) of the node B when the accumulated packet error count is greater than the product of the accumulated received packet count and the packet error rate threshold;
a decrease determination unit, for determining whether the accumulated received packet count is greater than or equal to a product of the base received packet count and a threshold parameter, and decreasing the target SIR when the accumulated received packet count is greater than or equal to the product of the base received packet count and the threshold parameter;
a reset unit, for determining whether the target SIR is adjusted by the first increase determination unit or the decrease determination unit, and resetting the accumulated received packet count and the accumulated packet error count when the target SIR is adjusted by the first increase determination unit or the decrease determination unit.

9. The radio network controller according to claim 8, wherein the initial configuration unit further calculates a tolerable packet error count according to a very-important-person (VIP) floating parameter or a non-very-important-person (NVIP) floating parameter, the target BLER and the base received packet count.

10. The radio network controller according to claim 9, further comprising:
a second increase determination unit, for determining whether the accumulated packet error count is greater than the tolerable packet error count to determine whether to increase the target SIR of the node B.

11. The radio network controller according to claim 8, wherein when the target SIR is not adjusted by the first increase adjusting unit or the decrease adjusting unit, the reset unit further determines whether the accumulated received packet count is greater than or equal to the base received packet count, and resets the accumulated received packet count and the accumulated packet error count when the accumulated received packet count is greater than or equal to the base received packet count.

12. The radio network controller according to claim 11, wherein after the reset operation of the reset unit, the data preparing unit, the first increase determination unit and the decrease determination unit iterate corresponding steps to perform loop control on the target SIR.

13. The radio network controller according to claim 8, wherein the first increase determination unit comprises:
a parameter determining sub-unit, for determining a fast factor parameter, a slow factor parameter and a step size;
a first step determining sub-unit, for generating a fast increase step according to the fast factor parameter and the step size;
a second step determining sub-unit, for generating a slow increase step according to the slow factor parameter and the step size
an adjusting sub-unit, for increasing the target SIR corresponding to a very-important-person (VIP) user equipment (UE) according to the fast increase step, and increasing the target SIR corresponding to a non-VIP (NVIP) UE according to the slow increase step.

14. The radio network controller according to claim 8, wherein the decrease adjusting unit comprises:
a parameter determining sub-unit, for determining a fast factor parameter, a slow factor parameter and a step size;
a first step determining sub-unit, for generating a slow decrease step according to the slow factor parameter and the step size;
a second step determining sub-unit, for generating a fast decrease step according to the fast factor parameter and the step size; and
an adjusting sub-unit, for decreasing the target SIR corresponding to a very-important-person (VIP) user equipment (UE) according to the slow decrease step, and decreasing the target SIR corresponding to a non-VIP (NVIP) UE according to the fast decrease step.

* * * * *